(12) United States Patent
Cui et al.

(10) Patent No.: US 12,082,031 B2
(45) Date of Patent: Sep. 3, 2024

(54) MEASUREMENT ENHANCEMENT FOR L1-RSRP

(71) Applicant: Apple Inc., Cupertino, CA (US)

(72) Inventors: Jie Cui, San Jose, CA (US); Yang Tang, San Jose, CA (US); Herbert R. Dawid, Herzogenrath (DE); Panagiotis Botsinis, Munich (DE); Yihong Qi, Santa Clara, CA (US); Dawei Zhang, Saratoga, CA (US); Hong He, San Jose, CA (US); Manasa Raghavan, Sunnyvale, CA (US); Qiming Li, Beijing (CN); Xiang Chen, Campbell, CA (US)

(73) Assignee: Apple Inc., Cupertino, CA (US)

( * ) Notice: Subject to any disclaimer, the term of this patent is extended or adjusted under 35 U.S.C. 154(b) by 312 days.

(21) Appl. No.: 17/593,282

(22) PCT Filed: Jan. 6, 2021

(86) PCT No.: PCT/CN2021/070386
§ 371 (c)(1),
(2) Date: Sep. 14, 2021

(87) PCT Pub. No.: WO2022/147672
PCT Pub. Date: Jul. 14, 2022

(65) Prior Publication Data
US 2023/0171629 A1 Jun. 1, 2023

(51) Int. Cl.
*H04W 24/10* (2009.01)
*H04L 5/00* (2006.01)

(52) U.S. Cl.
CPC .......... *H04W 24/10* (2013.01); *H04L 5/0048* (2013.01)

(58) Field of Classification Search
CPC ...... H04W 24/10; H04L 5/0048; H04L 5/005; H04L 5/0094
See application file for complete search history.

(56) References Cited

U.S. PATENT DOCUMENTS

2015/0358094 A1* 12/2015 Yi .................... H04W 72/54
370/252

FOREIGN PATENT DOCUMENTS

| CN | 111435856 | 7/2020 |
|---|---|---|
| WO | 2020/119597 | 6/2020 |

OTHER PUBLICATIONS

Apple et al., "On AP-CSI-RS based L1-RSRP measurement", 3GPP TSG RAN 4 Meeting #97-e, R4-2014270, Nov. 13, 2020, 3 sheets.
(Continued)

*Primary Examiner* — Dady Chery
(74) *Attorney, Agent, or Firm* — Fay Kaplun & Marcin, LLP (57) ABSTRACT

A user equipment (UE) may perform configured to perform layer 1 (L1) measurements and layer 3 (L3) measurements. The UE receives a first configuration for layer 1 (L1) measurements of a resource set comprising a plurality of reference signals (RS) and a second configuration for layer 3 (L3) measurements, the first configuration including periodic measurement occasions and a reporting periodicity for transmitting measurement reports comprising the L1 measurements, determines the L3 measurements collide with at least one of the plurality of RSs for the L1 measurements, wherein the colliding causes a determination of the L1 measurements to be muted for the at least one RS during at least one of the measurement occasions and alters at least a first measurement report so that the L1 measurements that collide with the L3 measurements are not reported in at least one reporting periodicity.

19 Claims, 7 Drawing Sheets

(56) References Cited

OTHER PUBLICATIONS

Qualcomm CDMA Technologies, "Requirements for L1-SINR measurement accuracy", 3GPP TSG RAN4 Meeting #97-e, R4-2014297, Nov. 13, 2020, 6 sheets.

* cited by examiner

MEASUREMENT ENHANCEMENT FOR L1-RSRP

BACKGROUND INFORMATION

In 5G NR, measurements may be performed on a reference signal to determine channel properties. For example, a reference signal received power (RSRP) may be determined for layer 1 (L1) (physical layer) or layer 3 (L3) (radio resource control (RRC) layer). Two measurements, such as an L3 measurement and an L1 measurement, may be said to collide when a time occupancy (measurement period) of the physical channels scheduled for the measurement of the RS overlap in at least one OFDM symbol.

When L1 measurements are configured for a resource set comprising a plurality of RSs, some of the RSs in the set may collide with L3 measurements, while other RSs in the set may not collide with L3 measurements. In current specifications, a scaling factor may be applied to extend a measurement period for L1 measurements for colliding RSs. In this scenario, L1 measurement results for the colliding RSs may not be updated in every reporting period. Thus, in a measurement report, some of the L1 measurement results may be current while other measurement results are out of date. Inefficiencies may result if the network is not aware of which measurement results are current and which are out of date.

SUMMARY

Some exemplary embodiments are related to a processor of a user equipment (UE) configured to perform operations. The operations include receiving a first configuration for layer 1 (L1) measurements of a resource set comprising a plurality of reference signals (RS) and a second configuration for layer 3 (L3) measurements, the first configuration including periodic measurement occasions and a reporting periodicity for transmitting measurement reports comprising the L1 measurements, determining the L3 measurements collide with at least one of the plurality of RSs for the L1 measurements, wherein the colliding causes a determination of the L1 measurements to be muted for the at least one RS during at least one of the measurement occasions and altering at least a first measurement report so that the L1 measurements that collide with the L3 measurements are not reported in at least one reporting periodicity.

Other exemplary embodiments are related to a processor of a user equipment (UE) configured to perform operations. The operations include receiving a first configuration for layer 1 (L1) measurements of a resource set comprising a plurality of reference signals (RS) and a second configuration for layer 3 (L3) measurements, the first configuration including periodic measurement occasions and a reporting periodicity for transmitting measurement reports comprising the L1 measurements, determining the L3 measurements collide with at least one of the plurality of RSs for the L1 measurements, wherein the colliding causes the L1 measurements to be muted for the at least one RS during at least one of the measurement occasions and indicating, in the measurement reports, which L1 measurements are for RSs that have not been muted between a previous measurement report and a current measurement report or within a predefined duration before the first measurement report.

Still further exemplary embodiments are related to a user equipment (UE) having a transceiver and a processor. The transceiver is configured to communicate with a network. The processor is communicatively coupled to the transceiver and configured to perform operations. The operations include receiving a first configuration for layer 1 (L1) measurements of a resource set comprising a plurality of reference signals (RS) and a second configuration for layer 3 (L3) measurements, the first configuration including periodic measurement occasions and a reporting periodicity for transmitting measurement reports comprising the L1 measurements, determining the L3 measurements collide with at least one of the plurality of RSs for the L1 measurements, wherein the colliding causes a determination of the L1 measurements to be muted for the at least one RS during at least one of the measurement occasions and altering at least a first measurement report so that the L1 measurements that collide with the L3 measurements are not reported in at least one reporting periodicity.

Additional exemplary embodiments are related to a user equipment (UE) having a transceiver and a processor. The transceiver is configured to communicate with a network. The processor is communicatively coupled to the transceiver and configured to perform operations. The operations include receiving a first configuration for layer 1 (L1) measurements of a resource set comprising a plurality of reference signals (RS) and a second configuration for layer 3 (L3) measurements, the first configuration including periodic measurement occasions and a reporting periodicity for transmitting measurement reports comprising the L1 measurements, determining the L3 measurements collide with at least one of the plurality of RSs for the L1 measurements, wherein the colliding causes the L1 measurements to be muted for the at least one RS during at least one of the measurement occasions and indicating, in the measurement reports, which L1 measurements are for RSs that have not been muted between a previous measurement report and a current measurement report or within a predefined duration before the first measurement report.

DETAILED DESCRIPTION

The exemplary embodiments may be further understood with reference to the following description and the related appended drawings, wherein like elements are provided with the same reference numerals. The exemplary embodiments describe operations for reporting layer 1 (L1) measurements when a subset of the measurement results were potentially determined during a different measurement occasion than the remainder of the measurement results. According to some of the exemplary embodiments, to be explained in detail below, certain measurement results may be omitted from a measurement report. In other embodiments, to be explained in detail below, the measurement report includes an indication for whether some or all of the measurement results are current or were determined during a previous measurement occasion.

Network/Devices

Figure 1:
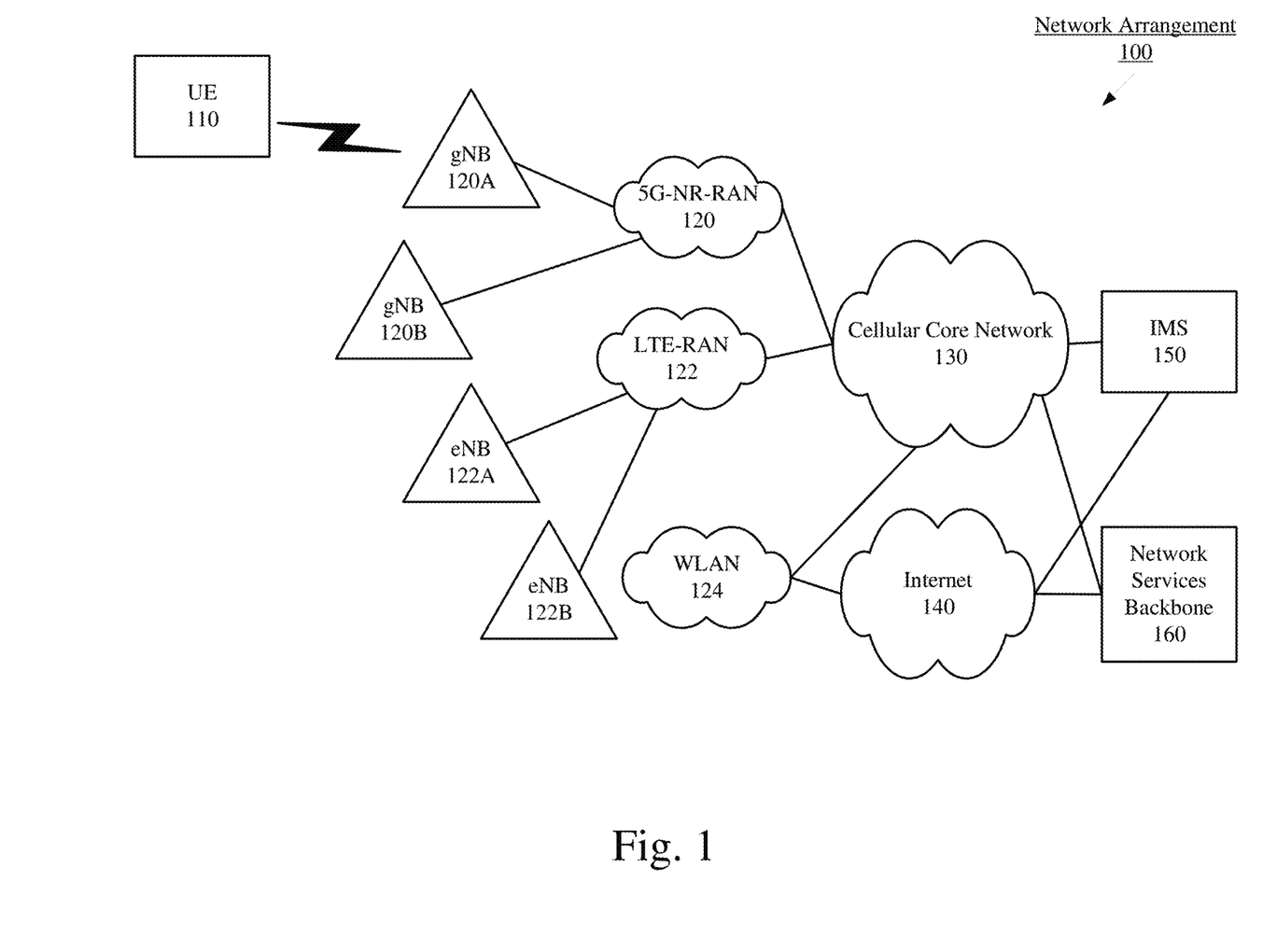
FIG. 1 shows a network arrangement according to various exemplary embodiments.

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g., legacy cellular networks) and the UE 110 may also communicate with networks over a wired connection. With regard to the exemplary embodiments, the UE 110 may establish a connection with the 5G NR-RAN 120.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation NodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNBs 120A, 120B is merely for illustrative purposes. The exemplary embodiments may apply to any appropriate number of gNBs.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
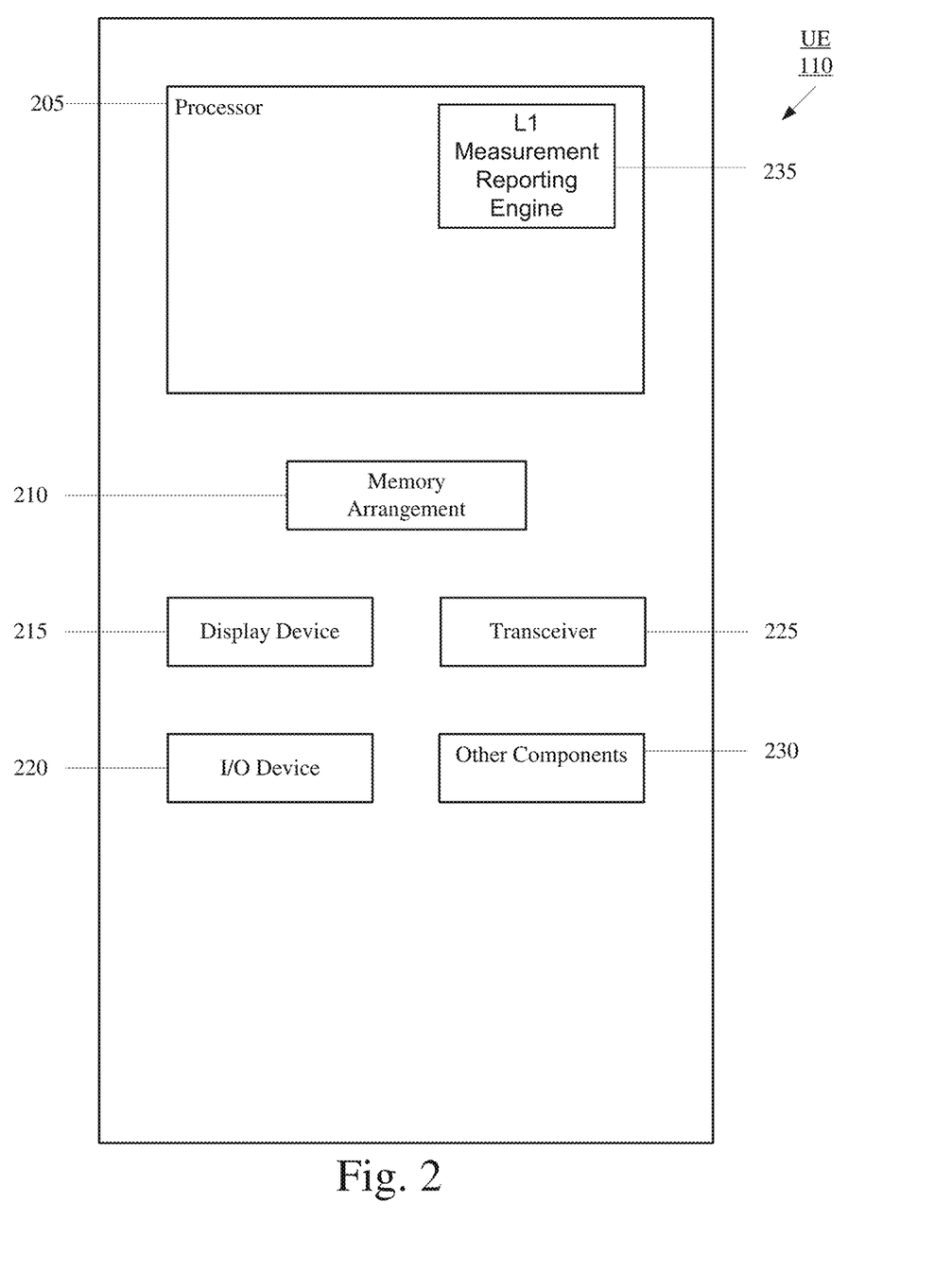
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include an L1 measurement reporting engine 235. The L1 measurement reporting engine 235 may perform operations including determining whether L1 measurements are colliding with L3 measurements. When such a collision is determined, some measurement results for RSs in a resource set may not be synchronized with measurement results for other RSs in the resource set. The L1 measurement reporting engine 235 may implement operations to, for example, omit certain measurement results from the measurement report or notify the network as to the whether some or all of the measurement results included in the measurement report are current or were determined in a previous measurement occasion, to be explained in detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
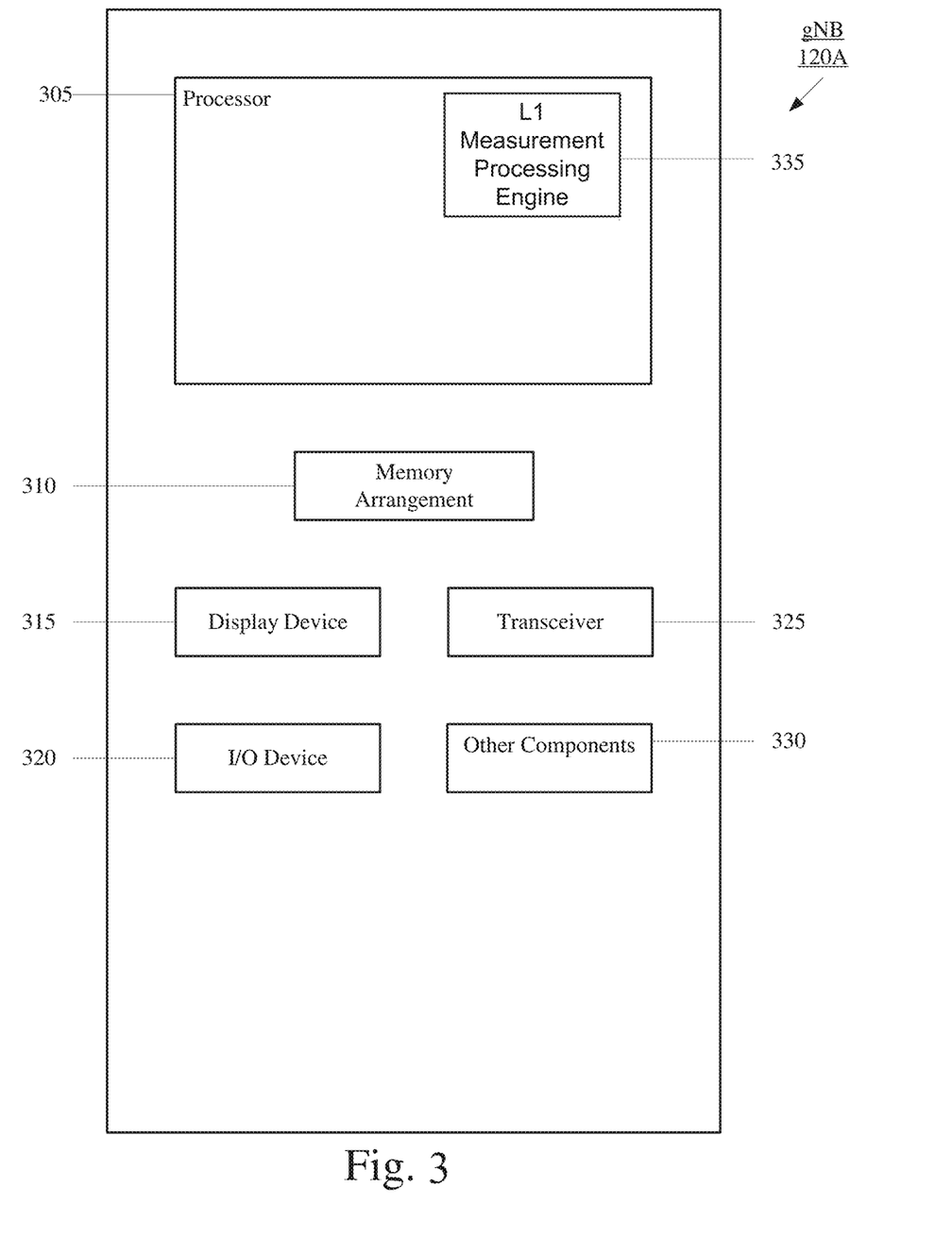
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a serving cell for the UE 110. The gNB 120A may represent any access node of the 5G NR network through which the UEs 110 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include an L1 measurement processing engine 335. The L1 measurement reporting engine 335 may perform operations including receiving and processing measurement reports from a UE and performing beam management in reliance thereon, to be explained below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100, e.g., if the gNB 120A serves as a PCell or an SCell to either or both of the UEs 110, 112. The transceiver 325 may operate on a variety of different frequencies or channels (e.g., set of consecutive frequencies). Therefore, the transceiver 325 may include one or more components (e.g., radios) to enable the data exchange with the various networks and UEs.

L1 Measurement Reporting

In 5G NR, measurements may be performed on a reference signal to determine channel properties. For example, a reference signal received power (RSRP) may be determined for layer 1 (L1) (physical layer) or layer 3 (L3) (radio resource control (RRC) layer). An RSRP measurement may be determined from RSs including a system synchronization block (SSB) or a channel state information (CSI) reference signal (CSI-RS). Two measurements, such as an L3 measurement and an L1 measurement, may be said to collide when a time occupancy (measurement period) of the physical channels scheduled for the measurement of the RS overlap in at least one OFDM symbol. It should be understood that the exemplary embodiments apply to other types of measurements and RSRP is used as an example.

In the current standards (e.g., 3GPP TS 38.133), for frequency range two (FR2) measurements, when an L3 measurement collides with an SSB/CSI-RS-based L1 measurement, a scaling factor P is used to extend both the L1 and L3 measurements. For example, according to current standards, $P_{sharing\ factor}=1$ (the measurement period is not extended) if the SSB configured for the L1-RSRP measurement outside the measurement gap is 1) not overlapped with the SSB symbols indicated by SSB-ToMeasure and 1 data symbol before each consecutive SSB symbols indicated by SSB-ToMeasure and 1 data symbol after each consecutive SSB symbols indicated by SSB-ToMeasure, given that SSB-ToMeasure is configured, and, 2) not overlapped with the RSSI symbols indicated by ss-RSSI-Measurement and 1 data symbol before each RSSI symbol indicated by ss-RSSI-Measurement and 1 data symbol after each RSSI symbol indicated by ss-RSSI-Measurement, given that ss-RSSI-Measurement is configured.

Otherwise, the $P_{sharing\ factor}=3$, where the measurement occasion is extended as shown and explained below with respect to Table 1. When $P_{sharing\ factor}=3$, the L1-RSRP measurements are muted (e.g., not measured) for the first two measurement occasions as will be described in greater detail below with respect to FIGS. 5-7.

The sharing factor is used to determine the total measurement period for L1-RSRP and L3 measurement, e.g., as shown in Table 1 below. The definition of M and N may be found in TS 38.133 section 9.5.4.1 (M is a sample number, N is the beam sweeping factor).

TABLE 1

| Configuration | $T_{L1\text{-}RSRP\_Measurement\_Period\_SSB}$ (ms) |
| --- | --- |
| non-DRX | $\max(T_{Report}, \text{ceil}(M * P * N) * T_{SSB})$ |
| DRX cycle < 320 ms | $\max(T_{Report}, \text{ceil}(1.5 * M * P * N) *$ $\max(T_{DRX}, T_{SSB}))$ |
| DRX cycle > 320 ms | $\text{ceil}(1.5 * M * P * N) * T_{DRX}$ |

Note:
$T_{SSB}$ = ssb-periodicityServingCell is the periodicity of the SSB-Index configured for L1-RSRP measurement.
$T_{DRX}$ is the DRX cycle length.
$T_{Report}$ is configured periodicity for reporting.

Based on the configuration for the scaling factor, the L1-RSRP measurement report for different SSBs may not be synchronized. That is, some of the SSBs, e.g., those SSBs that are not colliding with an L3 measurement, may have been measured more recently than other ones of the SSBs, e.g., those SSBs that are colliding with an L3 measurement and have thus been muted (e.g., not measured) during one or more recent measurement occasions.

Figure 4A:
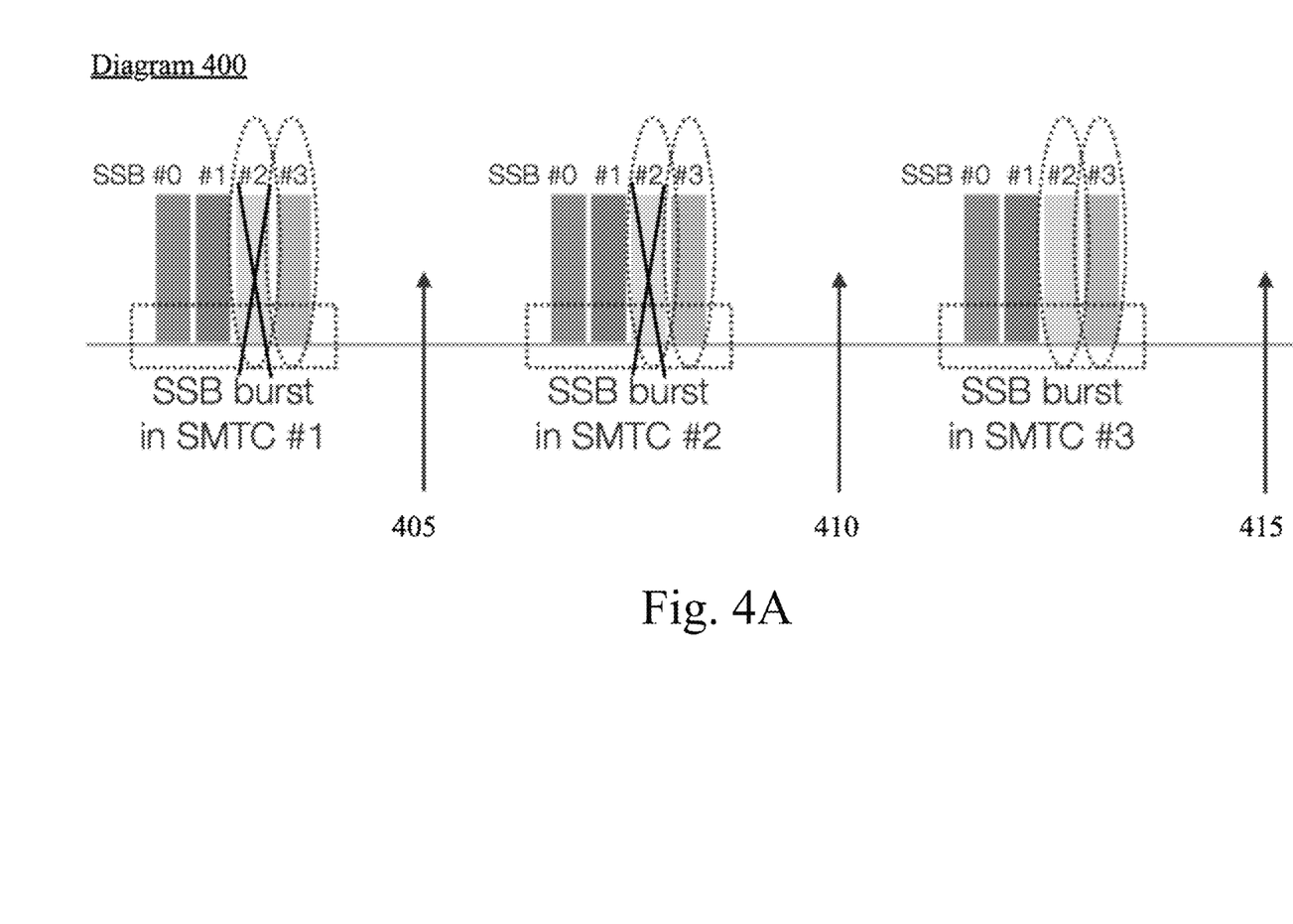
FIG. 4a shows an exemplary diagram for SSB-based measurements including both L1 and L3 measurements according to various exemplary embodiments.

FIG. 4a shows an exemplary diagram 400 for SSB-based measurements including both L1 and L3 measurements. As shown in FIG. 4a, four SSBs (SSB0, SSB1, SSB2 and SSB3) are configured in an SSB burst. SSBs 0/1/2 are configured for L3 measurements, and SSBs 2/3 are configured for L1-RSRP measurements. Based on the standards discussed above, in the example of FIG. 4a, the L1-RSRP measurement result for SSB #3 is updated every reporting periodicity (e.g., measurement report periodicity 405, 410, 415), while the L1-RSRP measurement result for SSB #2 is updated every 3 reporting periodicities due to SSB #2 colliding with the L3 measurement and SSB #3 and one symbol before/after SSB #3 is not colliding with L3 measurement.

The issue discussed above may also occur for CSI-RS-based L1-RSRP measurements when such measurement collides with an L3 measurement. The L1-RSRP measurement results for CSI-RS resources colliding with L3 measurement may not be synchronized with the L1-RSRP measurement results for other CSI-RS resource not colliding with L3 measurement, even though those CSI-RS resources are in the same resource set for either Tx beam refinement or Rx beam refinement.

Figure 4B:
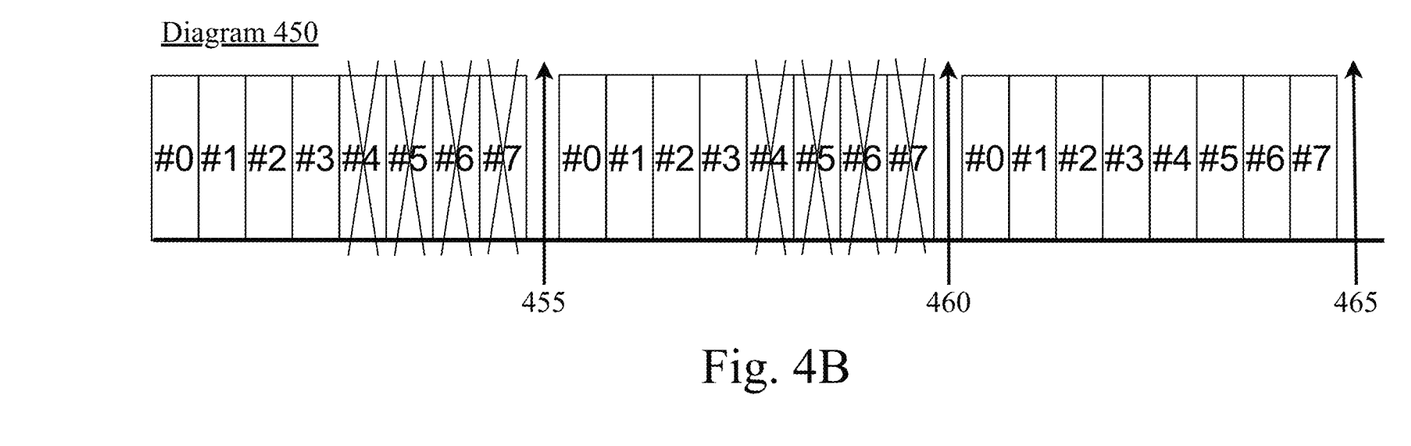
FIG. 4b shows an exemplary diagram for CSI-RS-based measurements according to various exemplary embodiments.

FIG. 4b shows an exemplary diagram 450 for CSI-RS-based measurements. As shown in FIG. 4b, eight CSI-RS resources are configured in a CSI-RS resource set. Each of the CSI-RS resources 0/1/2/3/4/5/6/7 are configured for L1-RSRP measurement, while L3 measurement occasions are configured in an SSB-based measurement timing configuration (SMTC) colliding with CSI-RS resources 4/5/6/7. The CSI-RS resources 0/1/2/3 are not colliding with the L3 measurement occasions in the SMTC, thus in every measurement report periodicity (e.g., measurement report periodicity 455, 460, 465), the L1-RSRP measurement could be updated accordingly to the latest measurement results. However, since CSI-RS resources 4/5/6/7 are colliding with L3 measurement occasions in the SMTC, and the L1-RSRP measurement has a sharing factor P=3 (every 3 measurement periodicities L1-RSRP can only use 1 measurement periodicity), the L1-RSRP measurement results may not be updated in the first two measurement report periodicities.

The L1-RSRP measurement report comprises the L1-RSRP measurement results for all L1-RSRP RSs (e.g., SSB or CSI-RS). However, as shown above, based on the existing methodology, L1-RSRP measurement results for different RSs in the same resource set may not be synchronized, e.g., some of the L1-RSRP RSs could be measured in the measurement occasion before every measurement report, but some of the L1-RSRP RSs may be measured in the measurement occasions preceding every X measurement reports, X>1, e.g., X=3. Since the UE measurement order is based on UE-implementation, the network is not aware of which measurement reports have a full set of updated measurement results. Therefore, the network may be misled into assuming that measurements that were determined prior to the most recent measurement occasion were determined during the most recent measurement occasion. As a result, the network may choose the wrong beam pair to serve this UE or choose a wrong beam to replace the current UE TCI for the channel reception.

The exemplary embodiments are directed to operations for addressing the issues discussed above. In a first exemplary embodiment, to be discussed in further detail below, the UE selects to report measurements only for the RSs that were updated since the last measurement report. In a second exemplary embodiment, to be discussed in further detail below, the UE delays the measurement report until all of the RSs have been updated. Thus, the UE synchronizes the measurement results of all the RSs in the same resource set. In a third exemplary embodiment, to be discussed in further detail below, the UE indicates additional information to the network. For example, the UE indicates in the measurement report which of the reported L1-RSRP measurements are not based on the latest measurement period. In another example, the UE indicates in the measurement report whether the measurement report comprises fully updated measurement results.

According to some exemplary embodiments, the UE selects to report the L1-RSRP measurement results based on the following criteria. For each measurement report, the UE reports only the successfully updated L1-RSRP measurement results and omits measurement results for L1-RSRP measurements that are not updated after the last measurement in the current measurement report occasion. If some of the RSs for L1-RSRP measurement have not been measured due to colliding with L3 measurement occasions between the last measurement report occasion and the current measurement report occasion, the UE does not report the L1-RSRP measurement results of those RSs. That is, in the current measurement report, UE reports only the L1-RSRP measurement results of those RSs which have been successfully measured between the last measurement report occasion and the current measurement report occasion and omits L1-RSRP measurement results that have not been updated during the current measurement occasion. In an alternative embodiment, the UE reports only the successfully updated L1-RSRP measurement results that have been determined within a predetermined duration prior to the current report and omits measurement results for L1-RSRP measurements that are not updated within the predetermined duration prior to the current report.

The above mentioned RSs are assumed to be in the same resource set. For CSI-RS, the same resource set means the CSI-RSs configured for L1-RSRP measurements are in the same CSI-RS resource set. For SSB, the same resource set means the SSBs configured for L1-RSRP measurements are in the same SSB burst.

Figure 5:
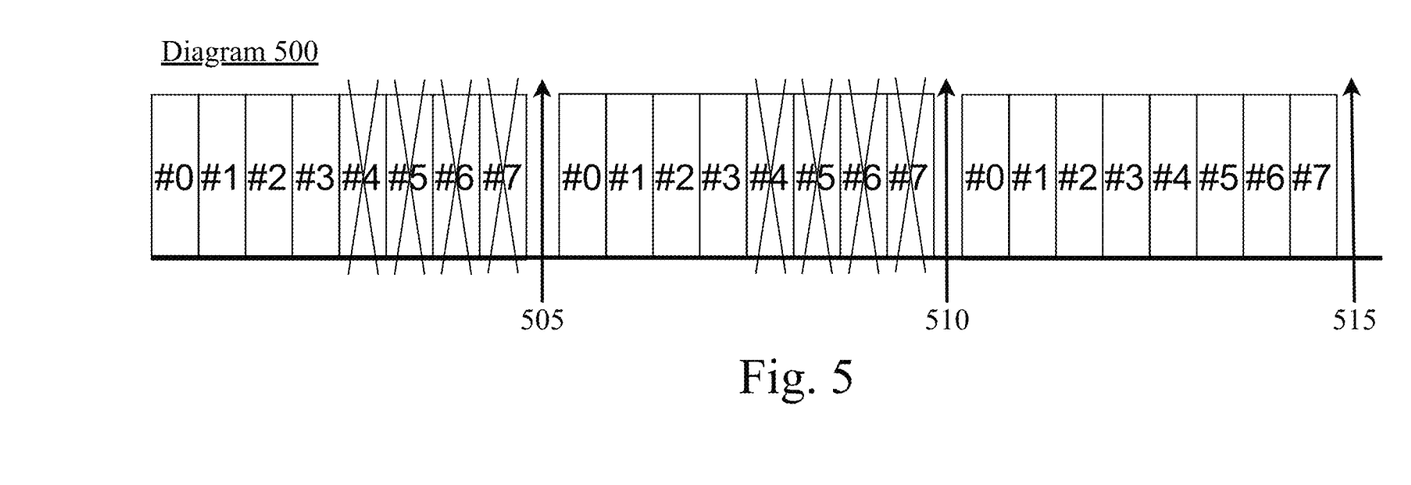
FIG. 5 shows a first exemplary diagram for CSI-RS-based measurement reporting according to various exemplary embodiments.

FIG. 5 shows a first exemplary diagram 500 for CSI-RS-based measurement reporting according to various exemplary embodiments. As shown in FIG. 5, eight CSI-RS resources are configured in a CSI-RS resource set. Each of the CSI-RS resources 0/1/2/3/4/5/6/7 are configured for L1-RSRP measurement, while L3 measurement occasions are configured in an SSB-based measurement timing configuration (SMTC) colliding with CSI-RS resources 4/5/6/7.

According to some exemplary embodiments, because the CSI-RS resources 0/1/2/3 are not colliding with the L3 measurement occasions in the SMTC, the UE reports, in every measurement report periodicity 505, 510, 515, the L1-RSRP measurements corresponding to the latest measurement results. However, since CSI-RS resources 4/5/6/7 are colliding with L3 measurement occasions in the SMTC, and the L1-RSRP measurement has a sharing factor P=3 (every 3 measurement periodicities L1-RSRP can only use 1 measurement periodicity), the L1-RSRP measurement results for CSI-RS resources 4/5/6/7 are not updated in the first two measurement report periodicities 505, 510. Thus, according to the first embodiment, the L1-RSRP measurement results for CSI-RS resources 4/5/6/7 are muted during the first two measurement reporting occasions 505, 510 and are reported only in the third measurement reporting occasion 515.

According to some exemplary embodiments, the UE reports L1-RSRP measurements based on the following criteria. The UE reports the updated L1-RSRP measurement results only if the L1-RSRP measurements have been successfully performed on all RSs in the same resource set. That is, only if all RSs in the same resource set have been successfully measured since the last L1-RSRP measurement report will the UE report the L1-RSRP measurement results in the current measurement report occasion. Otherwise, the UE will not report L1-RSRP measurement results for any RS in the current measurement results report occasion. The UE will instead delay the L1-RSRP measurement results report until all the RSs for L1-RSRP have been successfully measured. In an alternative embodiment, similar to above, the UE reports the L1-RSRP measurement results only when all the L1-RSRP measurements were successfully updated within a predetermined duration prior to the current report and omits measurement results when any of the L1-RSRP measurements were not updated within the predetermined duration prior to the current report.

Similar to above, the RSs subject to the conditions above are in a same resource set, meaning, for CSI-RS, the CSI-RSs are configured for L1-RSRP in the same CSI-RS resource set, and for SSB, the SSBs are configured for L1-RSRP in the same SSB burst.

Figure 6:
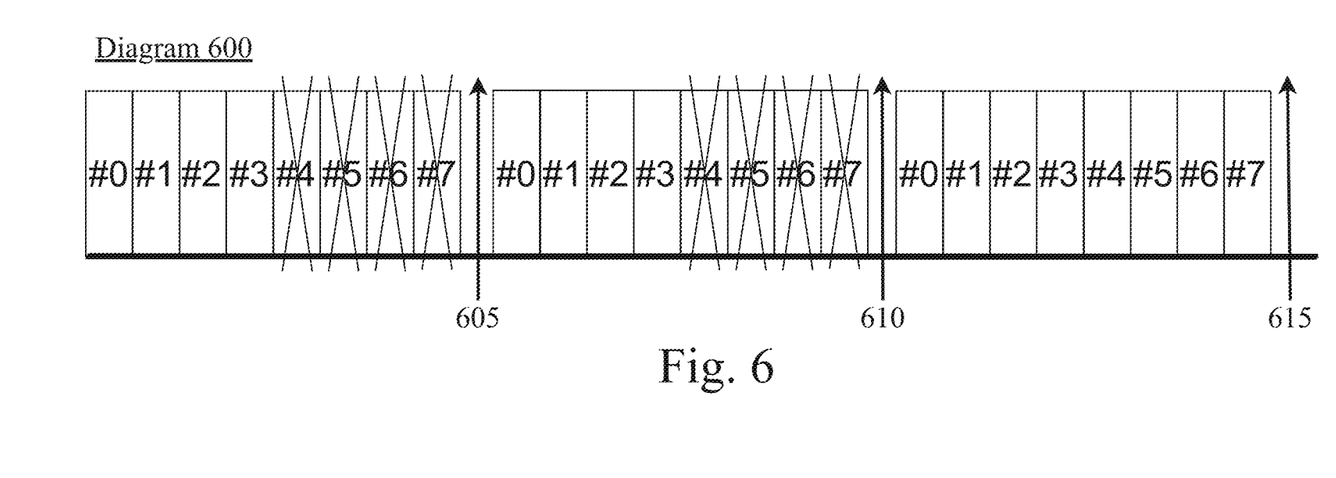
FIG. 6 shows a second exemplary diagram for CSI-RS-based measurement reporting according to various exemplary embodiments.

FIG. 6 shows a second exemplary diagram 600 for CSI-RS-based measurement reporting according to various exemplary embodiments. As shown in FIG. 6, similar to the diagram 500 shown in FIG. 5 discussed above, eight CSI-RS resources are configured in a CSI-RS resource set. Each of the CSI-RS resources 0/1/2/3/4/5/6/7 are configured for L1-RSRP measurement, while L3 measurement occasions are configured in an SSB-based measurement timing configuration (SMTC) colliding with CSI-RS resources 4/5/6/7.

According to some embodiments, because CSI-RS resources 4/5/6/7 are colliding with L3 measurement occasions in the SMTC, and the L1-RSRP measurement has a sharing factor P=3 (every 3 measurement periodicities L1-RSRP can only use 1 measurement periodicity), the L1-RSRP measurement results are not updated in the first two measurement report periodicities 605, 610. Thus, according to the second embodiment, the L1-RSRP measurement results for all CSI-RS resources 0/1/2/3/4/5/6/7 are muted during the first two measurement reporting occasions 605, 610 and are reported only in the third measurement reporting occasion 615. Although CSI-RS resources 0/1/2/3 are not colliding with the L3 measurement occasions in the SMTC, the UE does not report these CSI-RS measurements until the CSI-RS resources 4/5/6/7 have been updated.

According to some exemplary embodiments, the UE indicates additional information to the network in the L1-RSRP measurement report. In a first option, the L1-RSRP measurement report indicates the RSs of the RS resource set for which L1-RSRP measurements were not successfully performed after the last transmitted measurement report. Alternatively, the report may indicate the RSs for which L1-RSRP measurements were successfully performed after the last measurement report. For example, a bit may be configured for each of the RSs included in the measurement report for indicating whether or not the measurement for the RS has been updated since the last measurement report. Similar to above, the measurements are successfully performed for an RS when a measurement has been performed for the RS since the last measurement reporting period. That is, the L1 measurements did not collide with any L3 measurement occasions, in which case the measurements would have been muted.

In a second option, the L1-RSRP measurement report indicates the RSs of the RS resource set for which L1-RSRP measurements were not successfully performed in the closest measurement occasion before the current measurement report. Alternatively, the report may indicate the RSs for which L1-RSRP measurements were successfully performed in the closest measurement occasion before the current measurement report. The second option is similar to the first option, however, the second option considers scenarios in which a measurement report is not configured for every measurement period. For example, a measurement report may be configured for every two measurement periods. In this scenario, even if L1 measurements were performed in the first of the two measurement periods, if L1 measurements in the second of the two measurement periods due to colliding with an L3 measurement, the UE would indicate that such a measurement is not updated.

In a third option, the L1-RSRP measurement report indicates the RSs of the RS resource set for which L1-RSRP measurements were not successfully performed within a predefined duration before the current measurement report. Alternatively, the report may indicate the RSs for which L1-RSRP measurements were successfully performed within the predetermined duration before the current measurement report.

In a fourth option, the L1-RSRP measurement report indicates whether the current measurement report contains fully updated measurement results for all RSs in the resource set after the last measurement report. That is, the report indicates that all RSs in the same resource set have been successfully measured (not muted due to the collision with L3 measurement occasion), and thus the report contains fully updated measurement results, relative to a previous measurement report.

In a fifth option, the L1-RSRP measurement report indicates whether the current measurement report contains fully updated measurement results for all RSs in the same resource set in the closest measurement occasion before the current measurement report. That is, the report indicates that all RSs in the same resource set have been successfully measured (not muted due to the collision with L3 measurement occasion), and thus the report contains fully updated measurement results, relative to the closest measurement occasion.

In a sixth option, the L1-RSRP measurement report indicates whether the current measurement report contains fully updated measurement results for all RSs in the same resource set within a predefined duration before the current measurement report. That is, the report indicates that all RSs in the same resource set have been successfully measured (not muted due to the collision with L3 measurement occasion), and thus the report contains fully updated measurement results, relative to the predetermined duration before the current measurement report.

Figure 7:
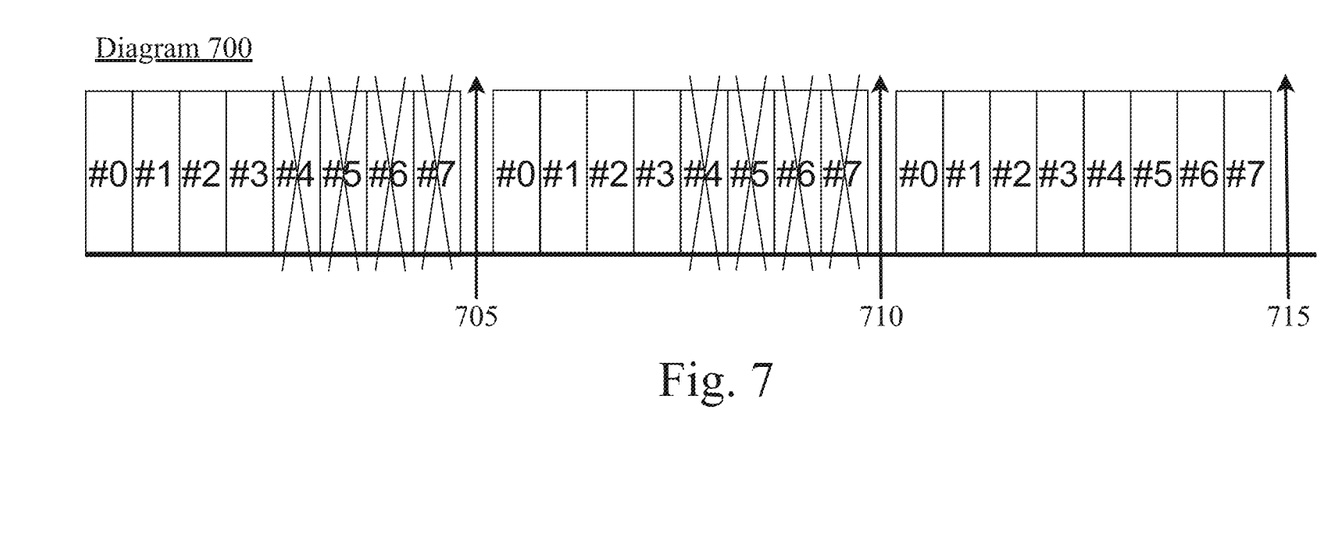
FIG. 7 shows a third exemplary diagram for CSI-RS-based measurement reporting according to various exemplary embodiments.

FIG. 7 shows a third exemplary diagram 700 for CSI-RS-based measurement reporting according to various exemplary embodiments. As shown in FIG. 7, similar to the diagrams 500, 600 above, eight CSI-RS resources are configured in a CSI-RS resource set. Each of the CSI-RS resources 0/1/2/3/4/5/6/7 are configured for L1-RSRP measurement, while L3 measurement occasions are configured in an SSB-based measurement timing configuration (SMTC) colliding with CSI-RS resources 4/5/6/7.

According to some embodiments, because CSI-RS resources 4/5/6/7 are colliding with L3 measurement occasions in the SMTC, and the L1-RSRP measurement has a sharing factor P=3 (every 3 measurement periodicities L1-RSRP can only use 1 measurement periodicity), the L1-RSRP measurement results are not updated in the first two measurement report periodicities 605, 610.

For the first option, the L1-RSRP measurement results for the CSI-RS resources 4/5/6/7 are indicated as being muted between a previous measurement report and a current measurement report for the first two measurement reporting occasions 705, 710, while the L1-RSRP measurement results for the CSI-RS resources 0/1/2/3 are indicated as not being muted between the previous measurement report and the current measurement report for the first two measurement reporting occasions 705, 710. In the third reporting occasion 715, the L1-RSRP measurement results for all of the CSI-RS resources are indicated as not being muted. This exemplary measurement report configuration would be the same for option 2. However, as discussed above, if a measurement report is configured for, e.g., every two measurement occasions, the reporting is configured relative to the measurements determined during the last measurement occasion.

According to the fourth option, in the above scenario, the L1-RSRP measurement results are indicated as some of the measurement results being muted across all of the CSI-RS resources for the first two measurement reporting occasions 705, 710. For the third measurement reporting occasion 715, the L1-RSRP measurement results are indicated as none of the measurement results being muted across all of the CSI-RS resources. This exemplary measurement report configuration would be the same for option 5. However, as discussed above, if a measurement report is configured for, e.g., every two measurement occasions, the reporting is configured relative to the measurements determined during the last measurement occasion.

Figure 8:
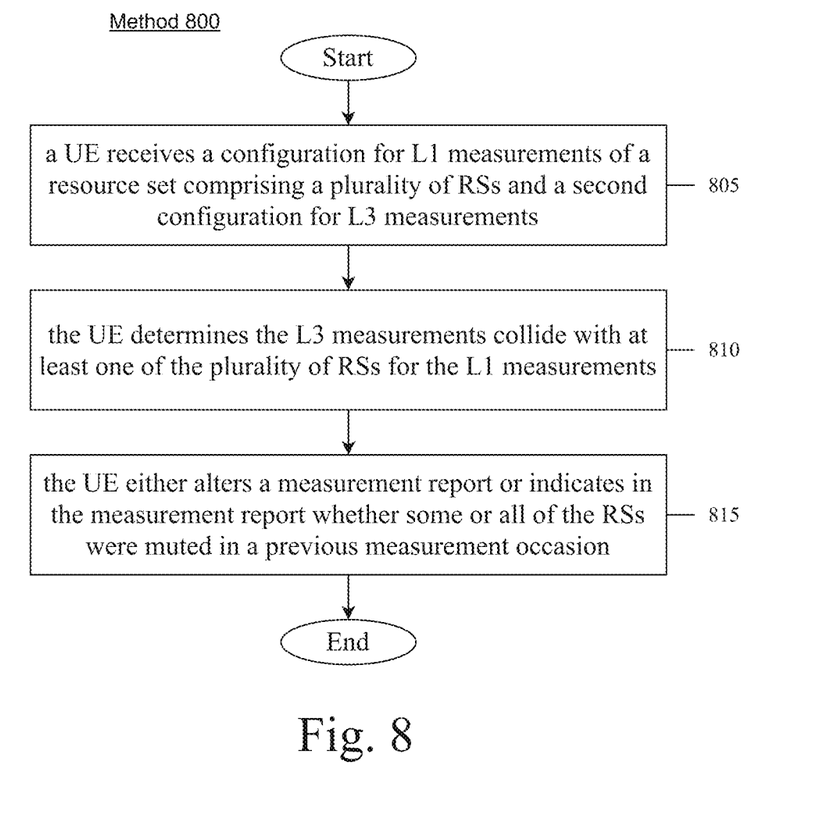
FIG. 8 shows a method for L1 measurement reporting according to various exemplary embodiments described herein.

FIG. 8 shows a method 800 for L1 measurement reporting according to various exemplary embodiments described herein. In 805, a UE receives a configuration for L1 measurements of a resource set comprising a plurality of RSs and a second configuration for L3 measurements. The L1 measurement configuration includes periodic measurement occasions and a reporting periodicity for transmitting measurement reports comprising the L1 measurements.

In 810, the UE determines the L3 measurements collide with at least one of the plurality of RSs for the L1 measurements. As discussed above, the colliding causes the UE to mute L1 measurements during at least one of the measurement occasions.

In 815, the UE either alters a measurement report so that the L1 measurements that collide with the L3 measurements are not reported or indicates in the measurement report whether some or all of the RSs were muted in a previous measurement occasion, according to the exemplary embodiments discussed above.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a user equipment (UE) configured to perform operations comprising:
receiving a first configuration for layer 1 (L1) measurements of a resource set comprising a plurality of reference signals (RS) and a second configuration for layer 3 (L3) measurements, the first configuration including periodic measurement occasions and a reporting periodicity for transmitting measurement reports comprising the L1 measurements;
determining L3 measurements colliding with at least one of the plurality of RSs for the L1 measurements, wherein the colliding causes a determination of the L1 measurements to be muted for the at least one RS during at least one of the measurement occasions; and
altering at least a first measurement report of L1 measurements based on the determination of collision with corresponding ones of the L3 measurements, wherein the at least one first measurement report comprises an identification of at least one of the L1 measurements not colliding and having been updated.

2. The processor of claim 1, wherein the alteration of the first measurement report comprises identifying L1 measurements for RSs that have been muted between a previous measurement report and the first measurement report or within a predefined duration before the first measurement report are included in the first measurement report.

3. The processor of claim 1, wherein the alternation of the first measurement report comprises:
identifying all L1 measurements as not being included in the first measurement report when any one of the plurality of RSs is muted between a previous measurement report and the first measurement report or within a predefined duration before the first measurement report.

4. The processor of claim 1, wherein the resource set is a channel state information (CSI) reference signal (CSI-RS) resource set comprising a plurality of CSI-RS.

5. The processor of claim 1, wherein the resource set is a synchronization signal block (SSB) burst comprising a plurality of SSBs.

6. The processor of claim 1, wherein the L1 measurements comprise reference signal received power (RSRP) measurements for the plurality of RSs.

7. The processor of claim 6, wherein the L1 RSRP measurements are subject to a scaling factor.

8. A processor of a user equipment (UE) configured to perform operations comprising:
receiving a first configuration for layer 1 (L1) measurements of a resource set comprising a plurality of reference signals (RS) and a second configuration for layer 3 (L3) measurements, the first configuration including periodic measurement occasions and a reporting periodicity for transmitting measurement reports comprising the L1 measurements;
determining L3 measurements colliding with at least one of the plurality of L1 measurements, wherein the colliding causes the L1 measurements to be muted for a corresponding one of the plurality of reference signals during at least one of the measurement occasions; and
indicating, in the measurement reports, L1 measurements that have not been muted, and updated, between a previous measurement report and a current measurement report or within a predefined duration before the first measurement report.

9. The processor of claim 8, wherein the indication in the measurement report indicates L1 measurements not successfully updated after the previous measurement report.

10. The processor of claim 8, wherein the indication in the measurement report L1 measurements not successfully updated within a predefined duration prior to the measurement report.

11. The processor of claim 8, wherein the indication in the measurement report indicates that all of the L1 measurements are not muted between the previous measurement report and the current measurement report.

12. The processor of claim 8, wherein the indication in the measurement report indicates that all of the L1 measurements are muted between a previous measurement occasion and the current measurement report.

13. The processor of claim 8, wherein the indication in the measurement report indicates that all of the L1 measurements are not muted within a predefined duration prior to the current measurement report.

14. The processor of claim 8, wherein the resource set is a channel state information (CSI) reference signal (CSI-RS) resource set comprising a plurality of CSI-RS or a synchronization signal block (SSB) burst comprising a plurality of SSBs.

15. The processor of claim 8, wherein the L1 measurements comprise reference signal received power (RSRP) measurements for the plurality of RSs, wherein the L1 measurements associated with a corresponding ones of the RSRP measurements are subject to a scaling factor.

16. A user equipment (UE) comprising:
a transceiver configured to communicate with a network; and
a processor communicatively coupled to the transceiver and configured to perform operations comprising:
receiving a first configuration for layer 1 (L1) measurements of a resource set comprising a plurality of reference signals (RS) and a second configuration for layer 3 (L3) measurements, the first configuration including periodic measurement occasions and a reporting periodicity for transmitting measurement reports comprising the L1 measurements;
determining L3 measurements colliding with the L1 measurements associated with at least one of the plurality of RSs, wherein the colliding causes a determination of the L1 measurements colliding with the L3 measurements at least one of the measurement occasions; and
altering at least a first measurement report comprising the L1 measurements, wherein the L1 measurements identified as colliding with the L3 measurements are identified as being muted and not being reported in at least one reporting periodicity.

17. The UE of claim 16, wherein the first measurement report is altered so that only the L1 measurements for RSs that have not been muted between a previous measurement report and the first measurement report or within a predefined duration before the first measurement report are included in the first measurement report.

18. The UE of claim 16, wherein the first measurement report is altered so that no L1 measurements are included in the first measurement report for any RSs when any one of the plurality of RSs is muted between a previous measurement report and the first measurement report or within a predefined duration before the first measurement report.

19. The UE of claim 16, wherein the resource set comprises one of (a) is a channel state information (CSI) reference signal (CSI-RS) resource set comprising a plurality of CSI-RS or (b) a synchronization signal block (SSB) burst comprising a plurality of SSB.

* * * * *